(12) United States Patent
Joshi et al.

(10) Patent No.: US 6,247,124 B1
(45) Date of Patent: Jun. 12, 2001

(54) BRANCH PREDICTION ENTRY WITH TARGET LINE INDEX CALCULATED USING RELATIVE POSITION OF SECOND OPERATION OF TWO STEP BRANCH OPERATION IN A LINE OF INSTRUCTIONS

(75) Inventors: Chandra Joshi, Saratoga; Paul Rodman, Palo Alto; Peter Hsu, Fremont; Monica R. Nofal, Los Altos, all of CA (US)

(73) Assignee: MIPS Technologies, Inc., Mountain View, CA (US)

( * ) Notice: Subject to any disclaimer, the term of this patent is extended or adjusted under 35 U.S.C. 154(b) by 0 days.

(21) Appl. No.: 09/363,635

(22) Filed: Jul. 30, 1999

Related U.S. Application Data

(63) Continuation of application No. 08/781,851, filed on Jan. 10, 1997, now Pat. No. 5,954,815, which is a continuation of application No. 08/476,942, filed on Jun. 7, 1995, now abandoned, which is a division of application No. 08/168,744, filed on Dec. 15, 1993, now Pat. No. 5,604,909.

(51) Int. Cl.⁷ ............................................ G06F 9/32
(52) U.S. Cl. ......................... 712/240; 711/213; 712/23; 712/206; 712/215
(58) Field of Search .............................. 712/23, 215, 206, 712/240; 711/213

(56) References Cited

U.S. PATENT DOCUMENTS

| 4,580,214 | 4/1986 | Kubo et al. ............................ 710/100 |
| 4,635,194 | 1/1987 | Burger et al. .......................... 712/205 |

(List continued on next page.)

FOREIGN PATENT DOCUMENTS 42 11 222 A1   10/1992   (DE) .
42 16 905 A1   1/1993    (DE) .

(List continued on next page.)

OTHER PUBLICATIONS

Young, H.C. et al., "An Intelligent I–Cache Prefetch Mechanism", Proceedings IEEE International Conference on Computer Design: VLSI in Computers & Processors, Oct. 3–6, 1993, pp. 44–49.

(List continued on next page.)

Primary Examiner—Kenneth S. Kim
(74) Attorney, Agent, or Firm—Sterne, Kessler, Goldstein & Fox P.L.L.C.

(57) ABSTRACT

A computing system contains an apparatus having an instruction memory to store a plurality of lines of a plurality of instructions, and a branch memory to store a plurality of branch prediction entries, each branch prediction entry containing information for predicting whether a branch designated by a branch instruction stored in the instruction memory will be taken when the branch instruction is executed. Each branch prediction entry includes a branch target field for indicating a target address of a line containing a target instruction to be executed if the branch is taken, a destination field indicating where the target instruction is located within the line indicated by the branch target address, and a source field indicating where the branch instruction is located within the line corresponding to the target address. A counter stores an address value used for addressing the instruction memory, and an incrementing circuit increments the address value in the counter for sequentially addressing the lines in the instruction memory during normal sequential operation. A counter loading circuit loads the target address into the counter when the branch prediction entry predicts the branch designated by the branch instruction stored in the instruction memory will be taken when the branch instruction is executed, causing the line containing the target instruction to be fetched and entered into the pipeline immediately after the line containing the branch instruction. An invalidate circuit invalidates any instructions following the branch instruction in the line containing the branch instruction and prior to the target instruction in the line containing the target instruction.

23 Claims, 8 Drawing Sheets

U.S. PATENT DOCUMENTS

| | | | |
|---|---|---|---|
| 4,682,284 | 7/1987 | Schrofer | 710/55 |
| 4,777,587 | 10/1988 | Case et al. | 712/235 |
| 4,984,154 | 1/1991 | Hanatani et al. | 712/240 |
| 5,043,868 | 8/1991 | Kitamura et al. | 712/218 |
| 5,121,502 * | 6/1992 | Rau et al. | 712/24 |
| 5,133,077 | 7/1992 | Karne et al. | 712/23 |
| 5,136,697 | 8/1992 | Johnson | 712/239 |
| 5,233,694 | 8/1993 | Hotta et al. | 712/215 |
| 5,247,628 | 9/1993 | Grohoski | 712/214 |
| 5,267,350 | 11/1993 | Matsubara et al. | 712/205 |
| 5,283,873 | 2/1994 | Steely, Jr. et al. | 712/207 |
| 5,297,281 | 3/1994 | Emma et al. | 712/216 |
| 5,299,321 | 3/1994 | Iizuka | 712/212 |
| 5,317,701 | 5/1994 | Reininger et al. | 712/207 |
| 5,333,281 | 7/1994 | Nishikawa et al. | 712/218 |
| 5,367,703 | 11/1994 | Levitan | 712/23 |
| 5,390,355 * | 2/1995 | Horst | 712/206 |
| 5,404,552 | 4/1995 | Ikenaga | 712/41 |
| 5,414,822 | 5/1995 | Saito et al. | 712/240 |
| 5,553,254 | 9/1996 | Berstis et al. | 712/207 |
| 5,835,746 * | 11/1998 | Girardeau, Jr. et al. | 712/215 |
| 5,978,896 * | 11/1999 | Kahle et al. | 712/23 |

FOREIGN PATENT DOCUMENTS

| | | |
|---|---|---|
| 0 116 883 A2 | 8/1984 | (EP) . |
| 0 240 870 A2 | 10/1987 | (EP) . |
| 0 372 865 A2 | 6/1990 | (EP) . |
| 0 380 854 A2 | 8/1990 | (EP) . |
| 0 477 598 A2 | 4/1992 | (EP) . |
| 50-152629 | 12/1975 | (JP) . |
| 57-29153 | 2/1982 | (JP) . |
| 57-152046 | 9/1982 | (JP) . |
| 59-91549 | 5/1984 | (JP) . |
| 4-247522 | 9/1992 | (JP) . |
| 4-328636 | 11/1992 | (JP) . |
| 5-2484 | 1/1993 | (JP) . |

OTHER PUBLICATIONS

Supplementary European Search Report from EP 95 90 2965, completed Feb. 25, 1997, 2 pages.

International Search Report from PCT/JP94/02112, completed Feb. 15, 1995, 3 pages, with translation.

Supplementary Partial European Search Report from EP 95 90 2965, completed Sep. 27, 1996, 2 pages.

Slater, M., Microprocessor Report The Insider's Guide to Microprocessor Hardware, "Second–Generation i860 Premiers as i860XP", vol. 5, No. 11, pp. 5–9, 1991.

Hot Chips IV Symposium, Stanford University, Aug. 9–11, 1992, Message from the Programs Chairs, Message from the General Chair, Sunday tutorial schedule, Monday schedule, Tuesday schedule, and pp. 1.2.2–1.2.13.

Case, B., Microprocessor Report The Insider's Guide to Microprocessor Hardware, "IBM Delivers Firsts PowerPC Microprocessor", vol. 6, No. 14, pp. 5–10, 1992.

Case, B. et al., Microprocessor Report The Insider's Guide to Microprocessor Hardware, "DEC Enters Microprocessor Business with Alpha", vol. 6, No. 3, pp. 5–14, 1992.

Hot Chips V Symposium, Stanford University, Aug. 8–10, 1993, Message from the General Chair, Message from the Program Co–Chairs, Sunday tutorial schedule, Monday schedule, Tuesday schedule, and pp. 8.1.1–8.1.9.

Hot Chips V Symposium, Stanford University, Aug. 8–10, 1993, Message from the General Chair, Message from the Program Co–Chairs, Sunday tutorial schedule, Monday schedule, Tuesday schedule, and pp. 1.3.1–1.3.12.

Case, B., Microprocessor Report, "Intel Reveals Pentium Implementation Details", pp. 9–17, 1993.

* cited by examiner

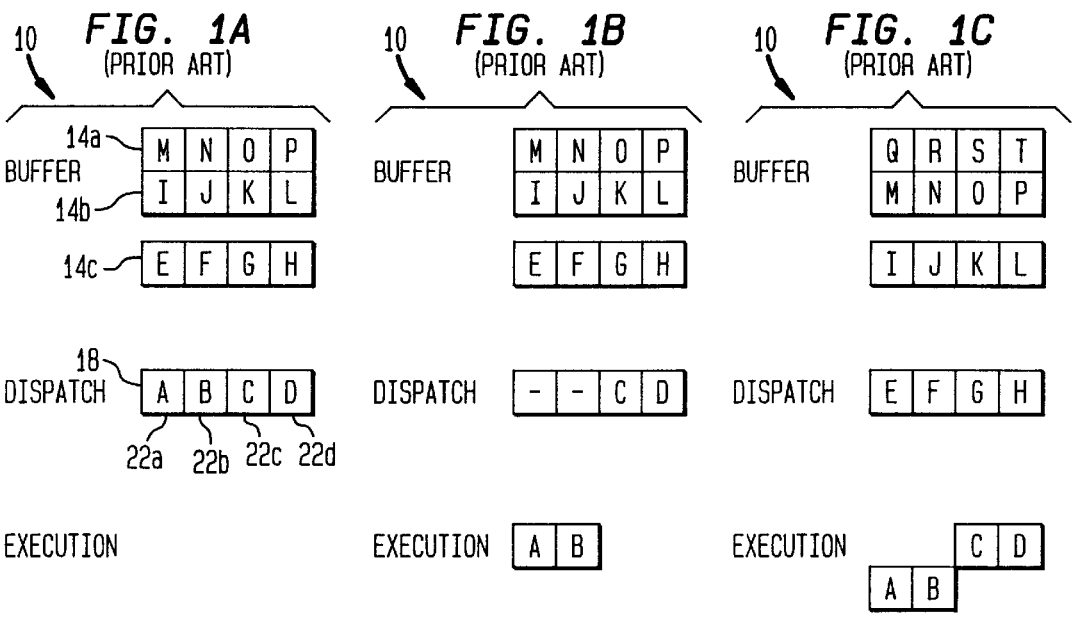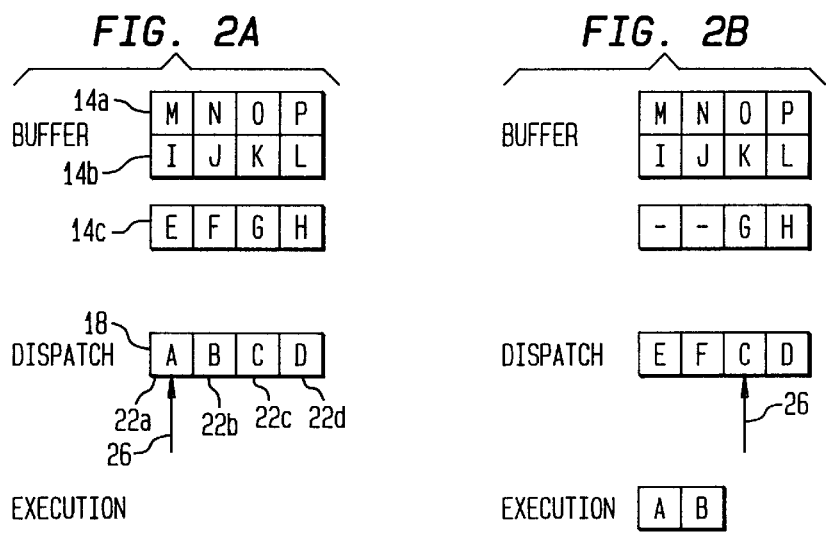

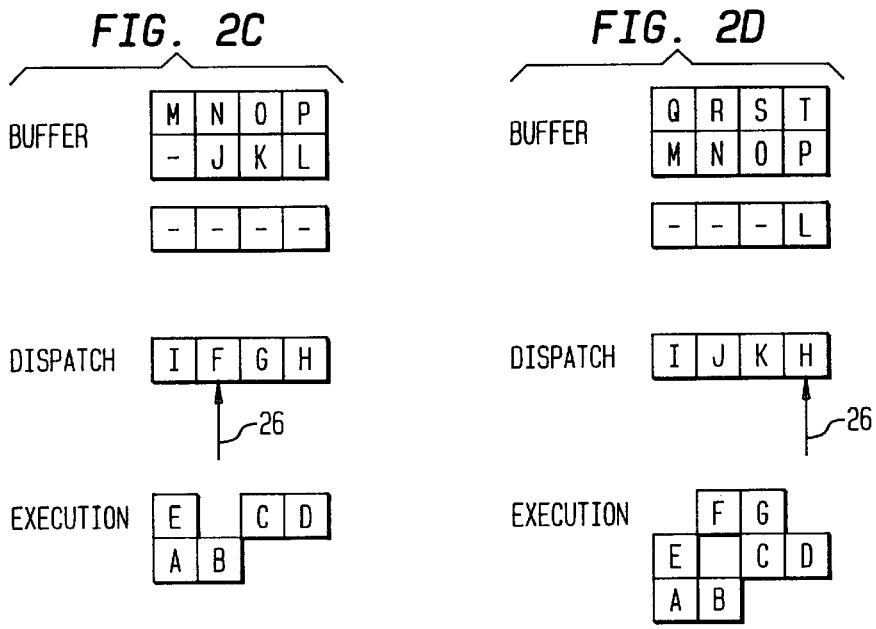
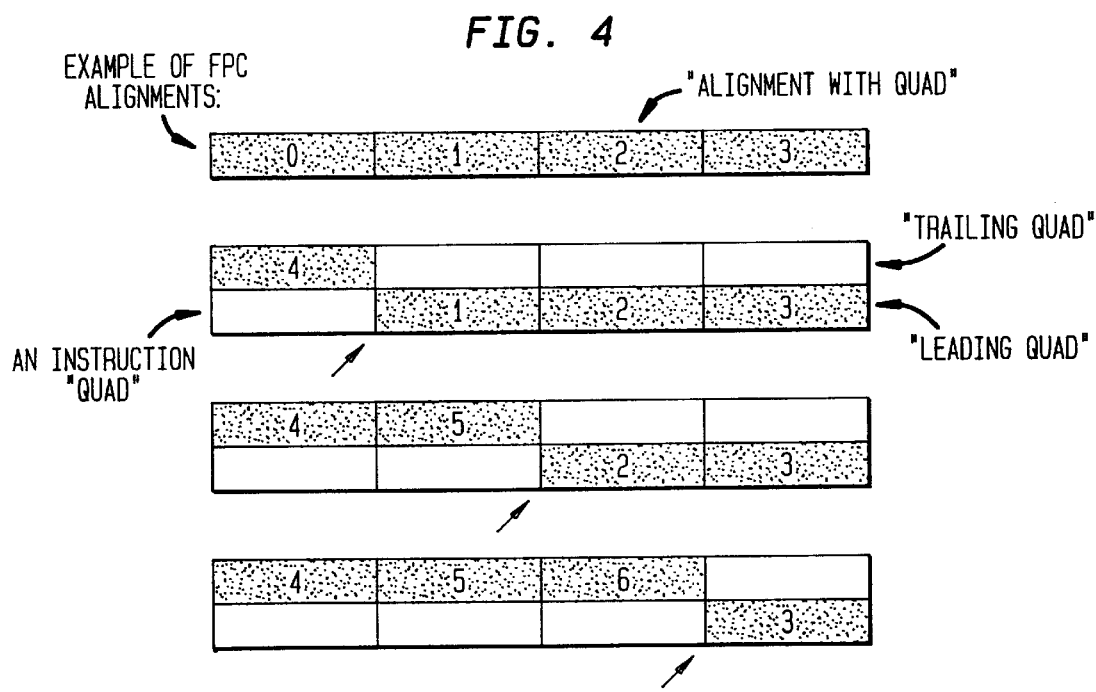

BRANCH PREDICTION ENTRY WITH TARGET LINE INDEX CALCULATED USING RELATIVE POSITION OF SECOND OPERATION OF TWO STEP BRANCH OPERATION IN A LINE OF INSTRUCTIONS

This application is a continuation of application Ser. No. 08/781,851 filed Jan. 10, 1997, now issued U.S. Pat. No. 5,954,815, which application is a continuation of application Ser. No. 08/476,942 filed Jun. 7, 1995, now abandoned, which application is a division of application Ser. No. 08/168,744 filed Dec. 15, 1993, now issued U.S. Pat. No. 5,604,909.

BACKGROUND OF THE INVENTION

This invention relates to computing systems and, more particularly, to an apparatus for processing instructions in a computing system.

In a typical computing system, instructions are fetched from an instruction memory, stored in a buffer, and then dispatched for execution by one or more central processing units (CPU's). FIGS. 1A–1C show a conventional system where up to four instructions may be executed at a time. Assume the instructions are alphabetically listed in program sequence. As shown in FIG. 1A, an instruction buffer 10 contains a plurality of lines 14A–C of instructions, wherein each line contains four instructions. The instructions stored in buffer 10 are loaded into a dispatch register 18, comprising four registers 22A–D, before they are dispatched for execution. When four instructions are dispatched simultaneously from dispatch register 18, then four new instructions may be loaded from buffer 10 into dispatch register 18, and the process continues. However, sometimes four instructions cannot be dispatched simultaneously because of resource contention or other difficulties. Fig. 1B shows the situation where only two instructions (A,B) may be dispatched simultaneously. In known computing systems, the system must wait until dispatch register 18 is completely empty before any further instructions may be transferred from buffer 10 into dispatch register 18 to accommodate restrictions on code alignment and type of instructions that may be loaded at any given time. Consequently, for the present example, at most only two instructions (C,D) may be dispatched during the next cycle (FIG. 1C), and then dispatch register 18 may be reloaded (with instructions E,F,G, and H). The restriction on the loading of new instructions into dispatch register 18 can significantly degrade the bandwidth of the system, especially when some of the new instructions (e.g., E and F) could have been dispatched at the same time as the instructions remaining in the dispatch register (C,D) had they been loaded immediately after the previous set of instructions (A,B) were dispatched.

Another limitation of known computing systems may be found in the manner of handling branch instructions where processing continues at an instruction other than the instruction which sequentially follows the branch instruction in the instruction memory. In the typical case, instructions are fetched and executed sequentially using a multistage pipeline. Thus, a branch instruction is usually followed by the pipeline by the instructions which sequentially follow it in the instruction memory. When the branch condition is resolved, typically at some late stage in the overall pipeline, instruction execution must be stopped, the instructions which follow the branch instruction must be flushed from the pipeline, and the correct instruction must be fetched from the instruction memory and processed from the beginning of the pipeline. Thus, much time is wasted from the time the branch condition is resolved until the proper instruction is executed.

SUMMARY OF THE INVENTION

The present invention is directed to an apparatus for processing instructions in a computing system wherein four instructions are always made available for dispatching regardless of how many instructions are previously dispatched, and without regard to code alignment or instruction type. In one embodiment of the invention, a computing system has first and second instruction storing circuits, each instruction storing circuit storing N instructions for parallel output. An instruction dispatch circuit, coupled to the first instruction storing circuit, dispatches L instructions stored in the first instruction storing circuit, wherein L is less than or equal to N. An instruction loading circuit, coupled to the instruction dispatch circuit and to the first and second instruction storing circuits, loads L instructions from the second instruction storing circuit into the first instruction storing circuit after the L instructions are dispatched from the first instruction storing circuit and before further instructions are dispatched from the first instruction storing circuit.

The present invention also is directed to an apparatus for processing instructions in a computing system wherein branches are predicted at the time of instruction fetch, and the predicted target instruction is fetched immediately so that the target instruction is available for execution immediately after the branch instruction is executed. In one embodiment of this aspect of the invention, an instruction memory stores a plurality of lines of a plurality of instructions, and a branch memory stores a plurality of branch prediction entries, each branch prediction entry containing information for predicting whether a branch designated by a branch instruction stored in the instruction memory will be taken when the branch instruction is executed. Each branch prediction entry includes a branch target field for indicating a target address of a line containing a target instruction to be executed if the branch is taken, a destination field indicating where the target instruction is located within the line indicated by the branch target address, and a source field indicating where the branch instruction is located within the line corresponding to the target address. A counter stores an address value used for addressing the instruction memory, and an incrementing circuit increments the address value in the counter for sequentially addressing the lines in the instruction memory during normal sequential operation. A counter loading circuit loads the target address into the counter when the branch prediction entry predicts the branch designated by the branch instruction stored in the instruction memory will be taken when the branch instruction is executed. That way the line containing the target instruction may be fetched and entered into the pipeline immediately after the line containing the branch instruction. An invalidate circuit invalidates any instructions following the branch instruction in the line containing the branch instruction and prior to the target instruction in the line containing the target instruction.

BRIEF DESCRIPTION OF THE DRAWINGS

FIG. 1A is a block diagram showing instruction fetch and dispatch in a known computing system;

FIG. 1B is a block diagram showing instruction fetch and dispatch in a known computing system;

FIG. 1C is a block diagram showing instruction fetch and dispatch in a known computing system;

FIG. 2A is a block diagram showing instruction fetch and dispatch in a particular embodiment of a computing system according to the present invention;

FIG. 2B is a block diagram showing instruction fetch and dispatch in a particular embodiment of a computing system according to the present invention;

FIG. 2C is a block diagram showing instruction fetch and dispatch in a particular embodiment of a computing system according to the present invention;

FIG. 2D is a block diagram showing instruction fetch and dispatch in a particular embodiment of a computing system according to the present invention.

FIG. 4 is a block diagram illustrating the operation of the instruction queuer of FIG. 3;

DESCRIPTION OF THE PREFERRED EMBODIMENT

FIGS. 2A–D are block diagrams showing instruction fetch and dispatch in a particular embodiment of a computing system according to the present invention. As in the example shown in FIGS. 1A–D, assume two instructions (A,B) are dispatched initially. However, unlike the example in FIGS. 1A–D, the two dispatched instructions (A,B) are immediately replaced by the next two sequential instructions (E,F) as shown in FIG. 2B. Thus, four instructions are available for dispatch in the next clock cycle. A pointer 26 is used to keep track of which instruction follows the previously dispatched instructions in the program sequence. If three instructions are dispatched in the next clock cycle, as shown in FIG. 2C, then the instruction indicated by pointer 26, together with the two sequentially following instructions, may be released by enabling the appropriate registers 22A, 22C, and 22D. Immediately thereafter, dispatch register 18 is loaded with the next three instructions in the program sequence from instruction buffer 10.

It should be noted at this point that two lines in the instruction buffer may need to supply the instructions loaded into dispatch register 18. For example, line 14C supplies instructions (G,H) and line 14 B supplies instruction (I) to dispatch register 18 in FIG. 2C. Assuming four instructions per line, the line which contains the next sequential program instruction to be loaded into dispatch register 18 may be termed the "leading quad", and any next buffer line which simultaneously supplies instructions to dispatch register 18 to complete the fill operation may be termed the "trailing quad". When the leading quad is emptied by the fill operation, then the contents of the buffer may be advanced by one line as shown in FIG. 2D. In FIG. 2D, two more instructions (F,G) are dispatched, and two instructions (J,K) are loaded in their place.

Figure 3:
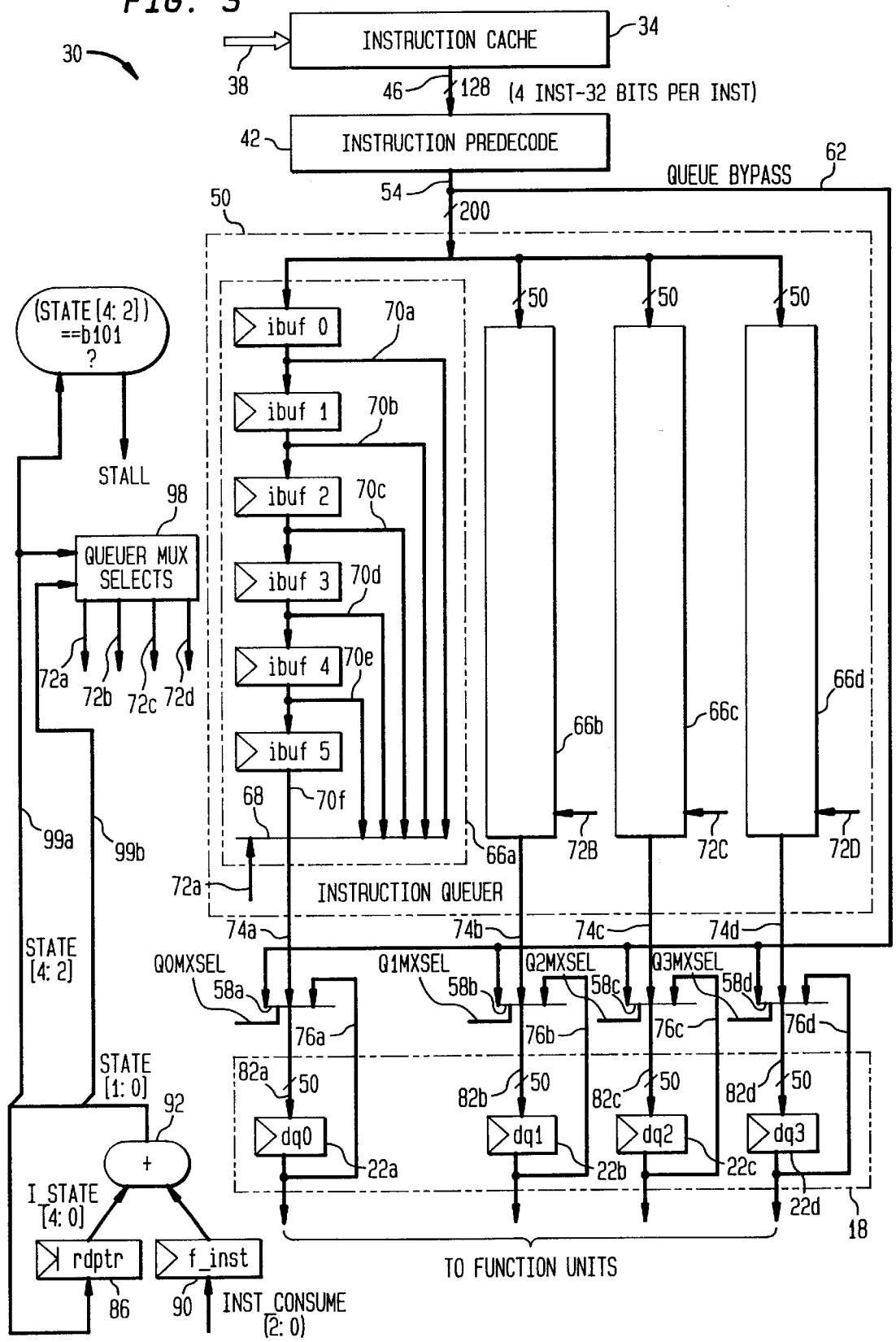
FIG. 3 is a block diagram of a particular embodiment of an apparatus according to the present invention for fetching and dispatching instructions.

FIG. 3 is a block diagram of a particular embodiment of an apparatus 30 for fetching and dispatching instructions according to the present invention. Apparatus 30 includes an instruction cache 34 which stores a plurality of lines of instructions that may be addressed by an address value received on a communication path 38. In this embodiment, each line stores four 32-bit instructions and communicates all the instructions in a line to a predecode circuit 42 over a communication path 46. Predecode circuit partially decodes the four instructions and communicates the four partially decoded instructions to an instruction queuer 50 over a communication path 54 and to dispatch multiplexers 58A–D over a queue bypass path 62.

Instruction queuer 50 includes four queue sections 66A–D, one for each instruction in each line. All four queue sections have the same construction, so only the details of queue section 66A shall be described. Queue section 66A includes a plurality, e.g., six, serially connected. instruction buffers IBUF0–IBUF5. Each instruction buffer is coupled to a multiplexer 68 through a corresponding multiplexer input path 70A–F. Multiplexer 68 selects one of the instructions from among instruction buffers IBUF0–IBUF5 in response to signals received over a line 72A and communicates the selected instruction to a dispatch multiplexer 58A over a communication path 74A. The current instruction in register 22A is also communicated to the input of dispatch multiplexer 58A over a feedback communication path 76A. Dispatch multiplexer 58A thus selects from among the output of multiplexer 68, queue bypass path 62, or feedback communication path 76A in response to signals received over a Q0MXSEL line 80A to communicate an instruction to register 22A over a communication path 82A. Register 22A then loads the received value in response to clock signals applied to the register (clocked registers are indicated by the angled symbol on the left side of each register), and then dispatches the instruction when possible.

Queue sections 66B–D also select instructions within one of their serially connected buffer sections in response to signals received over lines 72B–D, respectively, and communicate the selected instructions to dispatch multiplexers 58B–D over respective communication paths 74B–D. Dispatch multiplexers 58B–D communicate instructions, selected by signals received over Q1MXSEL–Q3MXSEL lines, to their respective registers 22B–D over communication paths 82B–D.

Apparatus 30 selects which instructions are to be presented to dispatch register 18 in the following manner. The first time a line of instructions is retrieved from instruction cache 34, instruction queuer 50 is empty, and multiplexers 58A–D select the instructions from queue bypass path 62. Instructions are then dispatched, and a new line of instructions are read from instruction cache 34.

In general, a new line of instructions is read from instruction cache 34 on every clock cycle. If four instructions were dispatched every clock cycle, then dispatch. register would always be loaded from queue bypass path 62. However, at any given cycle anywhere from zero to four instructions may be dispatched. Thus, if not all instructions are dispatched, then only certain ones of registers 22A–D are loaded from queue bypass path 62 pursuant to the number of instructions dispatched. The previously read line of instructions is then loaded into IBUF0 in each queue section 66A–D, and a new line of instructions is read from instruction cache 34. Thereafter, instructions are loaded from IBUF0 in the appropriate queue section 66A–D and from queue bypass path 62. For example, if two instructions are dispatched on the first cycle, then registers 22A–B are loaded from queue bypass path 62, registers 22C–D are reloaded with the same instructions via communication paths 76C–D, the previously read line of instructions is loaded into IBUF0 in queue sections 66A–D, and a new line of instructions is read from instruction cache 34. If only one instruction is dispatched during the next clock cycle, then register 22C is loaded from IBUF0 in queue section 66C, registers 22A, 22B, and 22D are reloaded with the same instructions via communication paths 76A, 76C, and 76D, the line of instructions stored in IBUF0 in each queue section 66A–D is advanced to IBUF1 in each queue section, the previously read line of instructions is loaded into IBUF0 in queue sections 66A–D, and a new line is read from instruction cache 34. The lines of instructions are advanced within queue sections 66A–D until the buffer is full. At that time the apparatus stalls further loading of instruction lines into the queue. This manner of operation allows the instruction prefetch operation to be decoupled from the dispatch operation.

A RDPTR register 86 stores a value I_STATE [4:0] for controlling the operation of instruction queuer 50. STATE [4:2] is used to determine which buffer IBUF0–IBUF5 in each queue section 66A–D supplies the next instruction to registers 22A–D, and STATE [1:0] functions as pointer 26 in FIGS. 2A–2C (a modulo-4 counter) to indicate which instruction is to be dispatched next. An F_INST register 90 stores an INST_CONSUME value indicating how many instructions are consumed in every cycle (i.e., the sum of queuer register clock enables, or the total number of instructions dispatched from dispatch register 18 whether valid or not). The INST_CONSUME value is discussed in conjunction with FIG. 8B. The INST_CONSUME value is added to STATE [4:0] by an adder 92 to point to the next instruction to be dispatched. STATE [4:2] is incremented every time the current line of instructions used to load dispatch register 18 is advanced in the queue. The updated value of STATE [4:0] is loaded back into RDPTR register 86 and communicated to a queuer mux select circuit 98 over communication paths 99A and 99B. If STATE[4:2]="101" (=5), the instruction buffer is full, and the apparatus stalls further loading of instruction lines into the queue.

Queuer mux select circuit 98 presents the next four sequential instructions (in program order) to dispatch register 18 in accordance with the values of STATE [4:2] and STATE [1:0]. FIG. 4 and Table 1 show which buffer in each queue section 66A–D supplies the next instruction to its corresponding register 22A–D in dispatch register 18 for the different values of STATE [1:0].

TABLE 1

| STATE [1:0] | Q0MXSEL | Q1MXSEL | Q2MXSEL | Q3MXSEL |
|---|---|---|---|---|
| 0 | STATE [4:2] | STATE [4:2] | STATE [4:2] | STATE[4:2] |
| 1 | STATE [4:2]-1 | STATE [4:2] | STATE [4:2] | STATE[4:2] |
| 2 | STATE [4:2]-1 | STATE [4:2]-1 | STATE [4:2] | STATE[4:2] |
| 3 | STATE [4:2]-1 | STATE [4:2]-1 | STATE [4:2]-1 | STATE[4:2] |

Thus, if STATE[1:0]=2 and STATE[4:2]=3, then registers 22C and 22D will be presented with the last two instructions in the leading quad (IBUF3), and registers 22A and 22B will be presented with the first two instructions in the trailing quad (IBUF2).

The described apparatus for fetching and dispatching instructions may be used in many environments with or without modification. For example, assume integer, memory, and floating point instructions are stored in instruction cache 34, and they may be mixed within a line of instructions. If there is a problem with resource contention and data dependencies with an instruction or type of instruction (e.g., floating point instructions), then those instructions may be dispatched into another queue where they can wait for the resource contention and data dependencies to clear without holding up dispatching of the other instructions.

Figure 5:
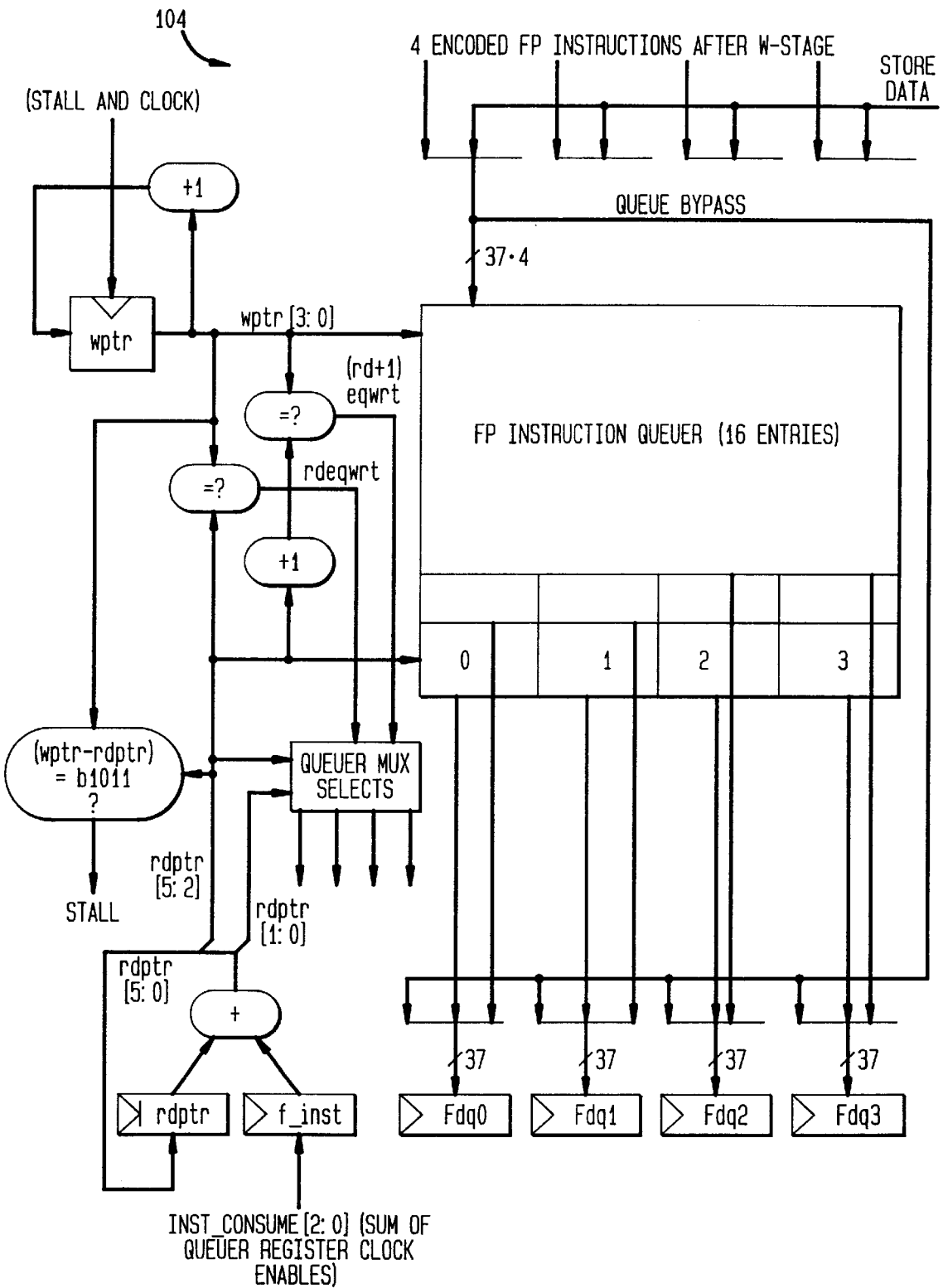
FIG. 5 is a block diagram of an alternative embodiment of an apparatus according to the present invention for fetching and dispatching instructions.

FIG. 5 is a block diagram of an alternative embodiment of an apparatus 104 according to the present invention for fetching and dispatching floating point instructions that may have been previously dispatched from dispatch register 18 in FIG. 3. From inspection it is apparent that apparatus 104 operates much like apparatus 30 in FIG. 3, except apparatus 104 also provides for storing data together with the instructions to handle integer store operation data or floating point register data that is to be loaded from the integer register.

Figure 6:
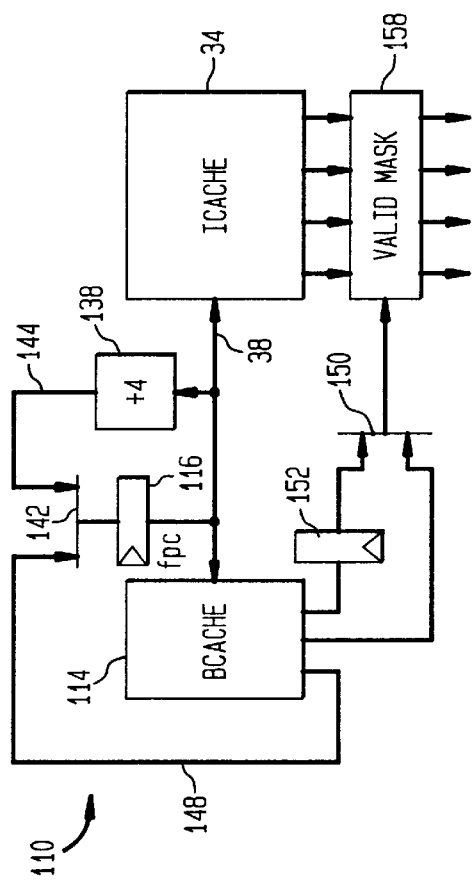
FIG. 6 is a block diagram of a particular embodiment of an apparatus according to the present invention for predicting branches.

The previously described apparatus also facilitates processing instructions in a computing system according to the present invention wherein branches are predicted at the time of instruction fetch, and wherein the predicted target instruction is fetched immediately so that the target instruction is available for execution immediately after the branch instruction is executed. FIG. 6 is a block diagram of a particular embodiment of an apparatus 110 according to the present invention for predicting branches. A branch prediction cache 114 is used to predict the outcome of branch instructions stored in instruction cache 34. For example, instruction cache 34 may be a 16 KB direct-mapped cache which outputs four instructions per cycle as noted above. In this embodiment, branch prediction cache 114 is also direct mapped and may contain 1K entries (one entry per four instructions in instruction cache 34 ). Instruction cache 34 and branch cache 114 are accessed in parallel in the fetch stage of the pipeline through communication path 38 which receives an index (address) value from a counter 116. Of course, instruction cache 34 and branch prediction cache 114 could be accessed with different addresses if desired.

Figure 7:
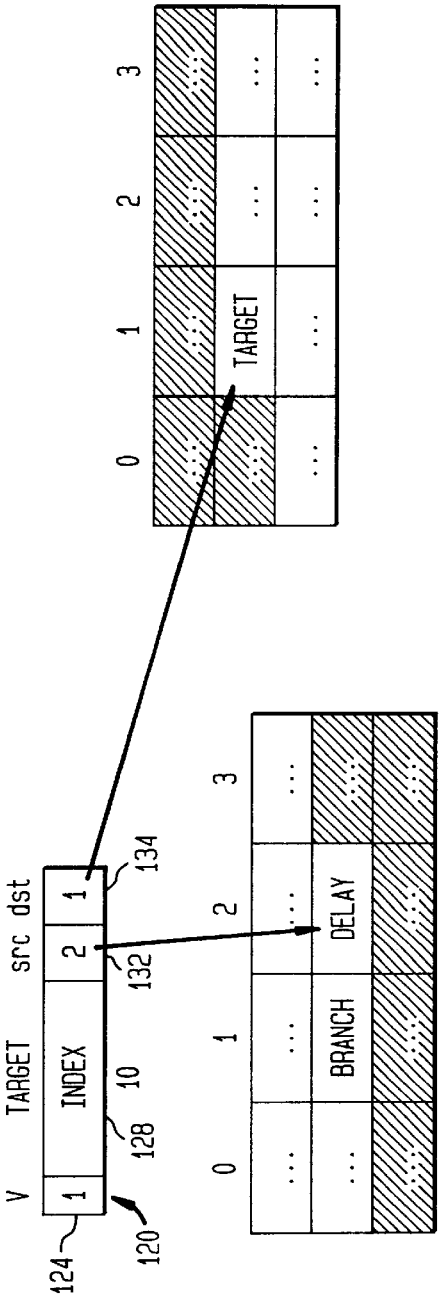
FIG. 7 is a block diagram of a particular embodiment of an entry in the branch cache shown in FIG. 5.

FIG. 7 shows a sample entry 120 from branch prediction cache 114 and an example of branch prediction. Entry 120 includes a valid field 124 for predicting whether the branch is taken (0=not predicted; 1=predicted), an index field 128 which is the instruction cache index of the branch target instruction, a source field (SRC) 132 which indicates the position of the last instruction to be executed within the line containing the branch instruction, and a destination field (DST) 134 which indicates the position of the branch target instruction within the line fetched by the cache index.

In this embodiment, each branch instruction actually comprises two instructions. The first instruction, termed the initial branch instruction, computes the branch target and the branch condition. The second instruction, termed a delay instruction, immediately follows the initial branch instruction and is used to actually change the program flow to the branch target instruction. consequently, the source field 132 typically indicates the position of the delay instruction within the instruction line as shown in FIG. 7.

The address value in counter 116 is communicated to an incrementing circuit 138 which increments the counter value by four (since there are four instructions per line) and communicates the incremented value to a multiplexer 142 through a communication path 144. Additionally, the value in the index field 128 of the branch cache entry is communicated to multiplexer 142 over a communication path 148. The value in the valid field 124 may be used to control the operation of multiplexer 142. Thus, if the branch is predicted (V=1), then instruction cache 34 will be addressed with the value from index field 128 in the next cycle. If the branch is not predicted (V=0), then instruction cache 34 will be addressed with the next sequential line of instructions as determined from incrementing circuit 138.

The value in source field 132 is communicated to a valid mask 158 through an OR circuit 150. If the branch is predicted, valid mask 158 invalidates all instructions in the current line which occur after the delay instruction associated with the branch, since they would not be executed if the branch were taken. For example, if the delay instruction is the third instruction in the line as shown in FIG. 7, then the fourth instruction will be invalidated. During the next clock cycle, the line (including any invalidated instructions) are communicated to instruction queuer 50 and queue bypass path 62 (FIG. 3), the value of the destination field is loaded into a register 152, the value of counter 116 is loaded with the value from index field 128, and instruction cache 34 is addressed to fetch the line which contains the predicted branch target instruction. The destination field in register 152 is then communicated to valid mask 158 through OR circuit 150 to invalidate the instructions which occur before the branch target instruction in the line. For example, if the branch target instruction is the second instruction in the line, then valid mask 158 invalidates the first instruction in the line. The line is then communicated to instruction queuer 50 and queue bypass path 62.

In this embodiment, all branch prediction cache entries are initialized with a valid field of zero (branch not predicted). When the program executes the first time, the result of each branch instruction is used to update the branch prediction cache entry (if necessary) by setting the valid bit to one, and by inserting the appropriate index, source, and destination values. Branch prediction thus may occur thereafter. If a branch previously taken is not taken at a later time, or if a branch not previously taken is taken at a later time, then the branch cache entry is updated (and correct instruction fetched) accordingly (discussed below).

Additionally, dispatch register 18 breaks (holds) the superscalar instructions which occur after the delay instruction of a predicted branch in dispatch register 18 to avoid mixing target instructions with a current branch instruction. Furthermore, dispatch register 18 breaks (holds) the superscalar instructions at the second branch when two branches are stored in dispatch register 18 so that only one branch at a time is allowed to execute.

Figure 8A:
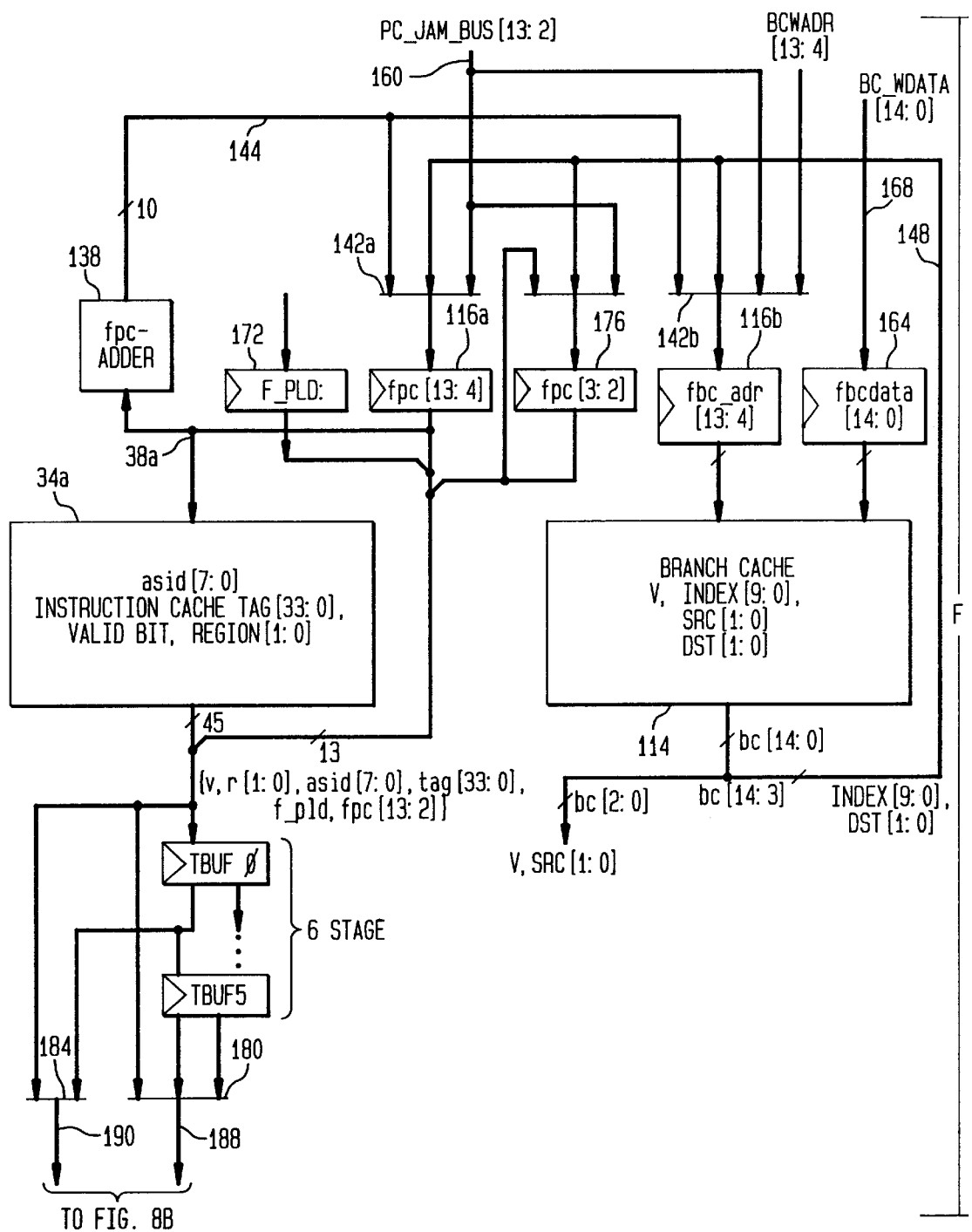
FIG. 8A is a block diagram of a particular embodiment of the fetch stage of an instruction pipeline according to the present invention.
Figure 8B:
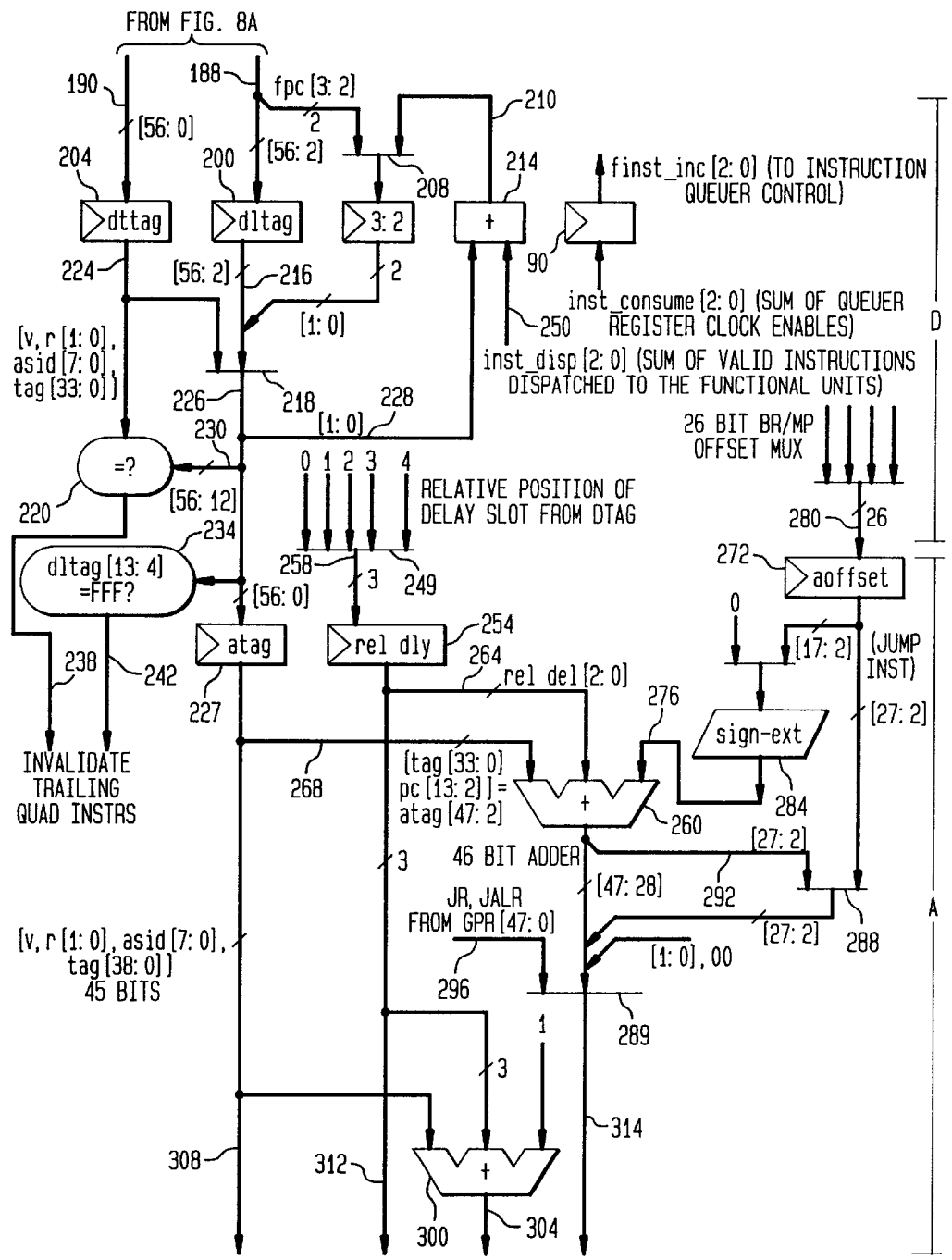
FIG. 8B is a block diagram of a particular embodiment of the decode and address generation stages of an instruction pipeline according to the present invention.
Figure 8C:
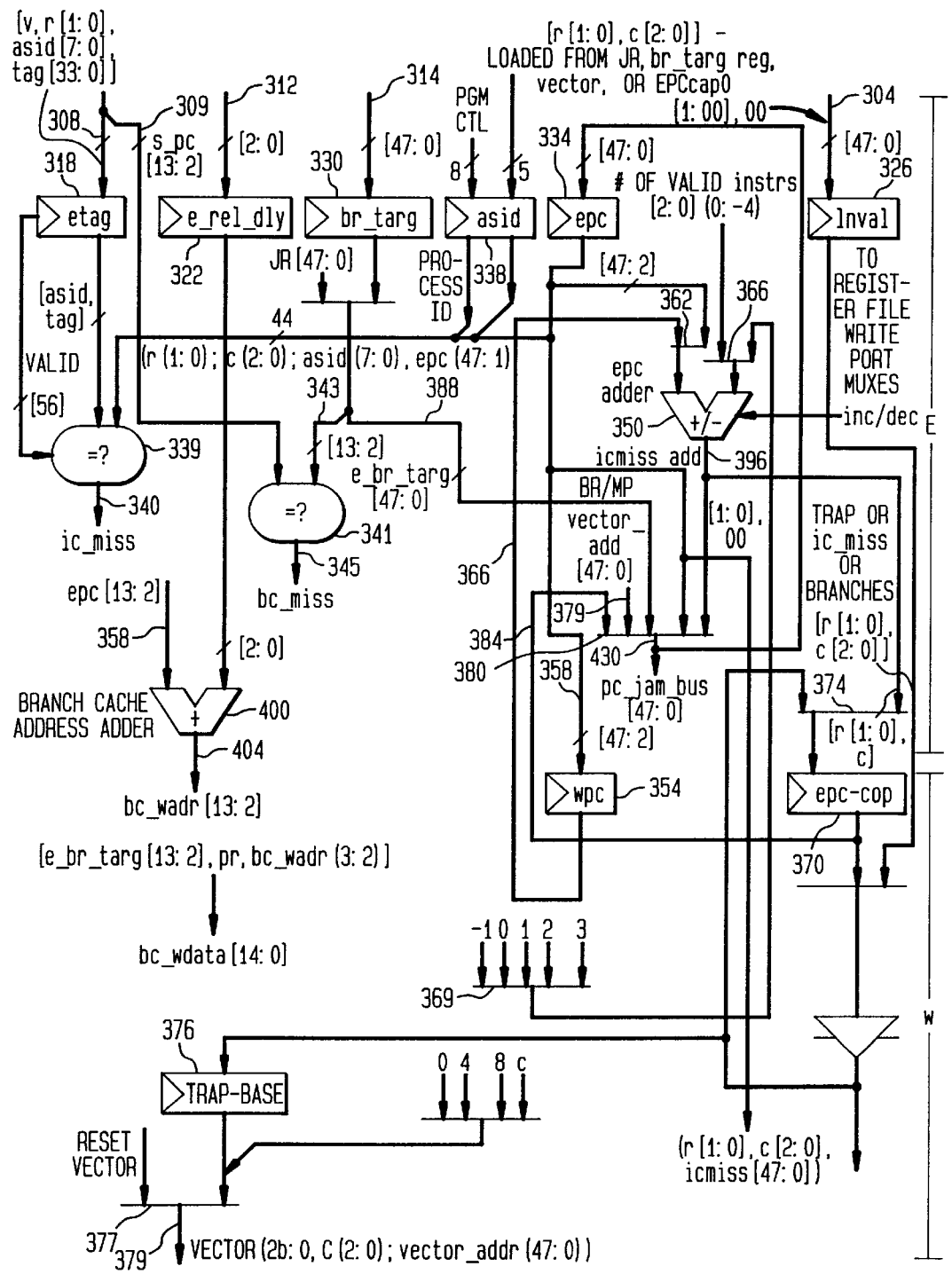
FIG. 8C is a block diagram of a particular embodiment of the executed and writeback stages of an instruction pipeline according to the present invention.

FIGS. 8A–8C are block diagrams of a particular embodiment of portions of an instruction pipeline according to the present invention showing how branch prediction operates. Where possible, reference numbers have been retained from previous figures. Instruction cache 34 may comprise an instruction memory and a tag memory as is well known in the art. The instruction memory portion may contain the lines of instructions, and the tag memory may contain the virtual address tags (and control information) associated with each line in the instruction memory. For the present discussion, only the tag memory portion (34A) of instruction cache 34 is illustrated. Tag memory 34A includes an application specific identification field (asid[7:0]), the instruction cache tag (tag[33:0], the high order 34 bits of the associated virtual address), a valid bit (V) and a region field (r[1:0]) for indicating the address space of the instruction.

FIG. 8A shows the Fetch (F) stage of the instruction pipeline. Counters 116A and 116 B are the primary F stage program counter which addresses tag memory 34A and branch cache 114. The value in counter 116A (fpc[13:4]), which indexes a line in tag memory 34A, is communicated to tag memory 34A and to incrementing circuit 138 over communication path 38A. Incrementing circuit 138 adds one to the counter value and communicates the incremented value to multiplexer 142A and multiplexer 142B over communication path 144. Multiplexers 142A and 142B also receive the index field from branch cache 114 over communication path 148, and a correction address (described below) over a communication path 160. The value on communication path 160 (pc_jam-bus[13:2]) is used to correct branch misprediction, cache misses, etc. Multiplexer 142B also receives a branch cache write address (bcwadr [13:4]) for updating the branch cache. The data used to update branch prediction cache 114 (bc_wdata[14:0]) is communicated to a register 164 over a communication path 168. Multiplexers 142A and 142B select the appropriate address and communicate it to counters 116A and 116B, respectively.

A register 172 stores a parallel load bit (f_pld) indicating whether counters 116A–B were loaded with the incremented value from incrementing circuit 138 or whether counters 116A–B were loaded from either communication path 148 or communication path 160, and a register 176 stores a value (fpc[3:2]) corresponding to the destination field of a branch prediction cache 114 entry (bits (4:3) of the bc(14:3) data on communication path 148 ). The values in registers 116A, 172, and 176 are combined with the output of tag memory 34A and stored in a queue register TBUF0, which is one of six registers (TBUF0–TBUF5) used to store tag data to correspond to the six instruction buffers IBUF0–IBUF5 in instruction queuer 50. Each register TBUF0–TBUF5 is coupled to multiplexers 180 and 184 which select the registers which correspond to the leading quad and trailing quad, respectively, in instruction queuer 50. The leading quad tag memory information is communicated to the next stage in the pipeline over a communication path 188, and the trailing quad tag memory information is communicated to the next stage in the pipeline over a communication path 190.

FIG. 8B shows the Decode (D) and Address Generation (A) stages of the instruction pipeline. In the D stage, bits [56:2] of the leading quad information from tag memory 34A is stored in a DLTAG register 200, and the trailing quad information from tag memory 34A is stored in a DTTAG register 204. The destination field of the branch prediction cache 114 entry (fpc[3:2]), if any, associated with the leading quad information is communicated to a multiplexer 208. The other input to multiplexer 208 is coupled to an output communication path 210 of an adder 214 which contains the pointer value of the position of the next sequential instruction to be dispatched during normal sequential execution. Multiplexer 208 selects either the destination value or the next sequential instruction value and communicates the selected value to the output communication path 216 of DLTAG register 200. Communication path 216 is coupled to an input of a multiplexer 218.

The trailing quad tag memory information stored in DTTAG register 204 is communicated to multiplexer 218 and to a compare circuit 220 over a communication path 224. Multiplexer 218 selects the tag information corresponding to the first instruction to be executed next and outputs the selected information on a communication path 226 to an ATAG register 227 in the A stage of the pipeline. The dispatch register pointer value is communicated to adder 214 over a communication path 228, the tag memory information is communicated to compare circuit 220 over a communication path 230, and the instruction cache index is communicated to a compare circuit 234.

Compare circuit 220 compares the leading quad tag to the trailing quad tag. If they do not match, then the leading quad instructions and the trailing quad instructions come from a different context, so they should not be dispatched simultaneously. A signal is provided on a communication path 238 to break the superscalar instructions when this occurs.

Compare circuit 234 compares the instruction cache index to the hex value "FFF" to determine if the end of the instruction cache is being addressed. If so, then it is desirable to break the superscalar instructions at the end of the cache line, and a signal is provided on a communication path 242 for that purpose.

Adder 214 receives a value indicating the sum of valid instructions dispatched over a communication path 250, and that value is used to increment the current dispatch register pointer value to produce the updated dispatch register pointer value on communication path 210.

During the D stage, register 90 (see also FIG. 3) is loaded with the value indicating the number of instructions consumed (both valid and invalid instructions), and this value is used to control the operation of instruction queuer 50 as discussed in conjunction with FIG. 3.

During the A stage, the actual branch address is generated. Since each branch instruction comprises an initial branch instruction followed by a delay instruction, and since the actual branch is accomplished after the delay instruction, the branch target address must be calculated relative to the delay instruction. Accordingly, when the tag information corresponding to the line containing the branch instruction is stored in ATAG register 227, a value indicating the relative position of the delay instruction within the line is selected by a multiplexer 249 and stored in a RELDLY register 254 via a communication path 258. The relative delay value is communicated to a branch target adder 260 over a communication path 264. Branch target adder 260 also receives the ATAG register 227 value (which is the address of the first instruction in the line) via a communication path 268, and an offset value from an AOFFSET register 272 via a communication path 276. AOFFSET register 272 receives the 26-bit offset value from the branch instruction over a communication path 280, and subjects bits [17:2] of the offset value to a sign extension function in a sign extension circuit 284 (if necessary) prior to forwarding the offset value to branch target adder 260. AOFFSET register 272 also communicates the 26-bit offset value to a multiplexer 288 which also receives bits [27:2] of the branch target address calculated by branch target adder 260 over a communication path 292. Multiplexer 288 thus allows bits [27:2] of the calculated branch target address to be replaced by the offset value stored in AOFFSET register 272.

The output from branch target adder 260 is communicated to one input of a multiplexer 289. The other input to multiplexer 289 is a branch target address from a JUMP or JUMP REGISTER instruction received over a communication path 296 coupled to the general purpose register file. Thus, the selected branch target address will be the output from branch target adder 260 (possibly modified by multiplexer 288 ) unless the branch was caused by a JUMP or JUMP REGISTER instruction, in which case the address specified by the appropriate register will take precedence.

The reason for the specific structure of the branch target address calculating circuits arises from the way the branch target addresses are calculated from the different types of branch instructions, namely a regular branch, JUMP, and JUMP REGISTER. For a regular branch instruction, the relative delay register value, the ATAG register value, and the offset value are added together to create the branch target address; for a JUMP instruction, the ATAG and REL_DLY register values are added, and the offset value is concatenated to the sum; and for a JUMP REGISTER instruction, the register value from communication path 296 is used for the branch target address.

The values from ATAG register 227 and RELDLY register 254 are also communicated to a return address adder 300. Return address adder 300 is used to calculate the return address when a branch results in the execution of a subroutine. After the subroutine is finished, it is desirable to return to the instruction immediately following the instruction which called it. Thus, return address adder 300 adds +1 to the addition of the tag, index, and relative delay to produce the address of the instruction following the delay slot of the branch instruction which called the subroutine. The return address is output on a communication path 304.

FIG. 8C shows the Execute (E) and Writeback (W) stages of the pipeline. The contents of ATAG register 227 are communicated to an ETAG register 318 over a communication path 308 and to a compare circuit 341 over a communication path 309, the contents of RELDLY register 254 are communicated to an E_REL_DLY register 322 over a communication path 312, the calculated return address from return address adder 300 is communicated to a link value (LNVAL) register 326 over communication path 304, and the selected branch target address from multiplexer 289 is communicated to a BR_TARG register 330 over communication path 314. An EPC register 334 stores the real address of the instruction the program is supposed to execute in the E stage, and an ASID register stores the program-controlled ASID of the instruction to be executed together with a coherence value (c[2:0]) which typically indicates whether the data used by the instruction is cacheable or not.

The ASID and tag stored in ETAG register 318 (corresponding to the instruction fetched) are compared to the ASID and tag from ASID register 338 and EPC register 334 (corresponding to the instruction that is actually supposed to be executed) by a compare circuit 339 to determine if the actual instruction expected to be executed (where the program should be) is actually the instruction fetched from the instruction cache. If the values do not match, then an instruction cache miss signal is provided on a communication path 340.

At this time, the value in ATAG register 227 corresponds to the line containing the predicted branch target instruction, whereas the value in BR_TARG register 330 corresponds to the actual branch target address. Thus, the index and destination field (the predicted branch target address) received from ATAG register 227 over communication path 309 is compared to the calculated branch target address received from BT_TARG register 330 over a communication path 343 by a compare circuit 341 to determine whether the actual branch target instruction expected to be executed corresponds to the predicted branch target instruction fetched from the instruction cache. If the values do not match, then a branch cache miss (branch misprediction) signal is provided on a communication path 345.

The value in EPC register 334 is communicated to a WPC register 354 in the writeback stage of the pipeline and to one input of a multiplexer 362 over a communication path 358.

The other input to multiplexer 362 receives the value in WPC register 354 (the original value of EPC register 334 delayed by one cycle) over a communication path 366. Multiplexer 362 selects one of theses values and communicates the selected value to one input of an EPC adder 350. EPC adder 350 is responsible for updating the value from EPC register 334 during normal operation. The value of EPC register 334 ordinarily is selected during normal operation, and the value of WPC register 354 is selected for exception processing.

The other input to EPC adder 350 is coupled to a multiplexer 366. One input to multiplexer 366 is the number of valid instructions dispatched from dispatch register 18, and the other input is an exception adjustment value from multiplexer 369 (−1 to +3). During normal operation, the value from EPC register 334 is incremented by the number of valid instructions dispatched from dispatch register 18 so that the value in EPC register 334 points to the next instruction to be executed. When an exception occurs (trap, instruction cache miss, etc), the exception adjustment value is added to the value in WPC register 354 to indicate the instruction which caused the exception. The value −1 is used when the exception was caused by a delay instruction, since in that case it is desirable to point to the branch instruction immediately before it. The value indicating which instruction caused the exception is stored in an EPC-COP register 370, which is reloaded with it's present value until another exception occurs via multiplexer 374. A TRAP-BASE register 376 stores an address that the program should go to when an exception occurs and communicates the value to a multiplexer 377. The other input to multiplexer 377 is a reset vector value. One of these values is selected and output on a communication path 379.

A multiplexer 380 receives the value from EPC-COP register 370 over a communication path 384 when returning from an exception, a vector address from communication path 379 on an exception condition, the calculated branch target address over a communication path 388 for branches, the EPC value from communication path 358 to hold the EPC value during an instruction cache miss, and the updated EPC value over communication path 396. The selected value is output on a communication path 430 (PC_JAM_BUS [47:0]), of which bits [13:2] are the correction values supplied to the F stage circuitry shown in FIG. 8A to correctly index the instruction cache, tag memory 34A and branch prediction cache 114.

During normal operation, the updated EPC value is selected by multiplexer 380 and loaded into EPC register 334. When a branch cache miss occurs, multiplexer 380 selects the calculated branch target address and communicates the new branch target address to branch cache 114 via communication path 160 (FIG. 8A). The write address used to update branch prediction cache 114 is calculated by a branch cache address adder 400 which adds the value in EPC register 334 to the value in E_REL_DLY register 322 and produces the write address on a communication path 404. It should be noted that the value of bits [3:2] on communication path 404 correspond to the position of the delay instruction and may be used as the source field in the branch prediction cache entry. The remaining write data on communication path 168 comprises bits [13:2] of the calculated branch target address, which is the updated index and destination field entries.

While the above is a description of a preferred embodiment of the present invention, various modifications may be employed yet remain within the scope of the present invention. Consequently, the scope of the invention should be ascertained from the appended claims.

What is claimed is:

1. An apparatus for processing instructions within a program wherein branches are predicted at the time of instruction fetch, comprising:

an instruction memory for storing a plurality of lines of a plurality of instructions; and a branch memory for storing a plurality of branch prediction entries, wherein each of said branch prediction entries contains information for predicting whether a branch designated by a branch instruction stored in said instruction memory will be taken when said branch is executed, each of said branch prediction entries including a valid field for predicting whether said branch will be taken, an index field for indicating a branch target address of a line of instructions containing a branch target instruction to be executed if said branch is taken, a source field for indicating the position of said branch instruction to be executed within a line of instructions containing said branch instruction, wherein said branch instruction is comprised of an initial branch instruction for computing a branch target and a branch condition, and a delay instruction, wherein said delay instruction follows said initial branch instruction and changes the flow of the program to said branch target instruction, wherein said branch target address is calculated using a value indicating the relative position of said delay instruction within the line of instructions containing said branch instruction, an address of a first instruction in the line of instructions containing said branch instruction, and an offset value from said branch instruction, and a destination field for indicating the position of said branch target instruction within a line of instructions fetched using said index field.

2. The apparatus of claim 1, further comprising:

a program counter, connected to said instruction memory and said branch memory, for supplying an address value for parallel addressing of said instruction memory and said branch memory;

an incrementing circuit, connected to said program counter, for incrementing said address value for sequential addressing of said instruction memory and said branch memory; and a selection circuit that accepts as input said incremented address value from said incrementing circuit and said index field from said branch memory and selects as output one of said inputs, based upon said valid field, to be loaded into said program counter as said address value.

3. The apparatus of claim 1, further comprising:

a valid mask, connected to said instruction memory and said branch memory, for invalidating all instructions occurring after said delay instruction associated with said initial branch instruction in said line of instructions as designated by said source field and for invalidating all instructions occurring before said branch target instruction in said line of instructions addressed by said index field and as indicated by said destination field.

4. The apparatus of claim 1, further comprising:

means for entering instructions into a pipeline, said instructions including said branch target instruction, wherein said branch target instruction is available for execution immediately after said delay instruction in said pipeline.

5. The apparatus of claim 1, further comprising:

means for holding instructions which occur after said delay instruction of a predicted branch to avoid mixing target instructions with a current branch instruction.

6. The apparatus of claim 1, further comprising:

means for holding instructions at a second branch when two branches are stored so that only one branch at a time is allowed to execute.

7. The apparatus of claim 4, further comprising:

means for comparing actual branch instruction results, after execution of said branch instruction, with said branch target instruction immediately following said delay instruction in said pipeline to determine whether an actual branch target instruction expected to be executed corresponds to a predicted branch target instruction; and means for updating said branch prediction entry when a misprediction occurs.

8. A system for predicting branches when an instruction is fetched in a program, comprising:

means for addressing a current line of instructions in an instruction memory and a branch prediction entry in a branch memory with an address value, wherein said branch prediction entry contains a valid field for predicting whether a branch is taken, an index field for indicating a branch target address of a line of instructions containing a branch target instruction to be executed if said branch is taken, a source field for indicating the position of a last instruction to be executed in a line of instructions containing a branch instruction if said branch is taken, and a destination field for indicating the position of said branch target instruction within a line of instructions fetched using said index field; and means for invalidating all instructions occurring after said branch instruction in said current line of instructions, as indicated by said source field, if said branch is predicted taken, wherein said branch instruction includes an initial branch instruction for computing a branch target and a branch condition, and includes a delay instruction for changing the flow of the program to said branch target instruction, wherein said branch target address is calculated using a value indicating the relative position of said delay instruction within the line of instructions containing said branch instruction, an address of a first instruction in the line of instructions containing said branch instruction, and an offset value from said branch instruction.

9. The system of claim 8, further comprising:

means for incrementing said address value for sequential addressing of said instruction memory and said branch memory; and means for selecting said incremented address value, if said branch is not predicted taken, and means for selecting said index field, if said branch is predicted taken.

10. The system of claim 8, further comprising:

means for entering said current line of instructions into an instruction queuer and queue bypass path for entry into a pipeline for execution, if said branch is predicted taken.

11. The system of claim 9, further comprising:

means for loading a program counter with an output from said selection means;

means for addressing said instruction memory to fetch a line of instructions containing a predicted target instruction if said branch is predicted taken; and means for invalidating all instructions occurring before the branch target instruction in said line of instructions containing said predicted target instruction, as indicated by said destination field, if said branch is predicted taken.

12. The system of claim 10, further comprising:

means for entering said line of instructions containing the predicted target instruction with the invalidated instructions into said instruction queuer and said queue bypass path for entry into said pipeline for execution, if said branch is predicted taken, wherein said branch target instruction immediately follows said delay instruction in said pipeline.

13. The system of claim 12, further comprising:

means for executing said branch instruction;

means for comparing actual branch instruction results with said branch target instruction immediately following said branch instruction in said pipeline to determine whether an actual branch target instruction expected to be executed corresponds to said predicted target instruction; and means for updating said branch prediction entry when a misprediction occurs.

14. A method for predicting branches when an instruction is fetched from a program, comprising the steps of:

(1) addressing a current line of instructions in an instruction memory and a branch prediction entry in a branch memory with an address value, wherein said branch prediction entry contains a valid field for predicting whether a branch is taken, an index field for indicating a branch target address of a line of instructions containing a branch target instruction to be executed if said branch is taken, a source field for indicating the position of a last instruction to be executed in a line of instructions containing a branch instruction if said branch is taken, and a destination field for indicating the position of said branch target instruction within a line of instructions fetched using said index field; and (2) invalidating all instructions occurring after said branch instruction in said current line of instructions, as indicated by said source field, if said branch is predicted taken, wherein said branch instruction includes an initial branch instruction for computing a branch target and a branch condition, and includes a delay instruction for changing the flow of the program to said branch target instruction, wherein said branch target address is calculated using a value indicating the relative position of said delay instruction within the line of instructions containing said branch instruction, an address of a first instruction in the line of instructions containing said branch instruction. and an offset value from said branch instruction.

15. The method of claim 14, further comprising the steps of:

incrementing said address value for sequential addressing of said instruction memory and said branch memory;

selecting one of said incremented address value, if said branch is not predicted taken, and said index field, if said branch is predicted taken;

loading a program counter with the selected value; and addressing said instruction memory to fetch a line of instructions containing a predicted target instruction if said branch is predicted taken.

16. The method of claim 14, further comprising the steps of:

(3) entering said current line of instructions into an instruction queuer and queue bypass path for entry into a pipeline for execution, if said branch, is predicted taken;

(4) invalidating all instructions occurring before said branch target instruction in said line of instructions containing said predicted target instruction, as indicated by said destination field, if said branch is predicted taken; and (5) entering a resultant line of instructions from step (4) into said instruction queuer and said queue bypass path for entry into said pipeline for execution, if said branch is predicted taken, wherein said branch target instruction immediately follows said delay instruction in said pipeline.

17. The method of claim 16, further comprising the steps of:

executing said branch instruction if said branch is predicted taken;

comparing actual branch instruction results with said branch target instruction immediately following said branch instruction in said pipeline if said branch is predicted taken to determine whether an actual branch target instruction expected to be executed corresponds to said predicted target instruction; and updating said branch prediction entry when a misprediction occurs if said branch is predicted taken.

18. A data structure on a computer readable-medium for a branch prediction cache, said branch prediction cache used to predict branches when a line of instructions having a branch instruction is fetched, said data structure comprising:

a valid field for predicting whether a branch is taken;

an index field for indicating a branch target address of a line of instructions containing a branch target instruction;

a source field for indicating the position of a last instruction to be executed within said line of instructions containing said branch instruction; and a destination field for indicating the position of said branch target instruction within the line of instructions fetched using said branch target address, wherein said branch instruction is comprised of an initial branch instruction for computing a branch target and a branch condition, and a delay instruction, said delay instruction immediately follows said initial branch instruction, wherein said delay instruction is used to change the program flow to the branch target instruction, and wherein said branch target address is calculated using a value indicating the relative position of said delay instruction within the line of instructions containing said branch instruction, an address of a first instruction in the line of instructions containing said branch instruction, and an offset value from said branch instruction.

19. A method for predicting branches at the time of instruction fetch, comprising the steps of:

(1) accessing, in parallel, a branch prediction cache and an instruction cache based on an address value from a counter, the branch prediction cache having a plurality of branch prediction cache entries, each entry having a valid field for predicting whether a branch is taken, an index field for indicating a branch target address of a line of instructions containing a branch target instruction, a source field for indicating the position of a last instruction to be executed in a line of instructions containing a branch instruction, and a destination field for indicating the position of said branch target instruction within the line of instructions fetched using said index field, the instruction cache having a plurality of branch instructions, each branch instruction having an initial branch instruction for computing a branch target and a branch condition, and having a delay instruction for changing the flow of a program to said branch target instruction;

(2) incrementing the address value to obtain an incremented address value;

(3) selecting one of the incremented address value and the value of the index field based on the value of the valid field;

(4) addressing the instruction cache using the selected value from step (3) to fetch the line of instructions containing the branch instruction;

(5) invalidating instructions that occur after said delay instruction in the line of instructions containing the branch instruction, if the branch is predicted taken;

(6) addressing the instruction cache using the value of the index field to fetch a line of instructions containing the branch target instruction, if the branch is predicted taken, wherein said branch target address is calculated using a value indicating the relative position of the delay instruction within the line of instructions containing the branch instruction, an address of a first instruction in the line of instructions containing the branch instruction, and an offset value from the branch instruction; and (7) invalidating instructions that occur before the branch target instruction in the line of instructions containing the branch target instruction, if the branch is predicted taken.

20. The method of claim 19, wherein step (5) further comprises the steps of:

communicating a value from the source field to a valid mask; and invalidating all instructions after the delay instruction using the value from the source field.

21. The method of claim 19, further comprising the step of:

communicating the line of instructions containing the branch instruction to an instruction queuer and queue bypass path.

22. The method of claim 19, further comprising the step of:

communicating the line of instructions containing the predicted branch target instruction to an instruction queuer and queue bypass path.

23. The method of claim 19, wherein step (7) further comprises the steps of:

communicating a value from the destination field to a valid mask; and invalidating all instructions prior to the branch target instruction using the value from the destination field.

* * * * *